(12) United States Patent
Suzuki et al.

(10) Patent No.: US 8,493,944 B2
(45) Date of Patent: Jul. 23, 2013

(54) TERMINAL POSITION MANAGING SERVER, ACCESS POINT, AND CALL CONTROL SERVER

(75) Inventors: Hidehiko Suzuki, Kawasaki (JP); Tatsuhiro Ando, Kawasaki (JP); Takuji Oyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 344 days.

(21) Appl. No.: 11/648,574

(22) Filed: Jan. 3, 2007

(65) Prior Publication Data

US 2007/0230422 A1 Oct. 4, 2007

(30) Foreign Application Priority Data

Mar. 30, 2006 (JP) .................................. 2006-094367

(51) Int. Cl.
*H04W 4/00* (2009.01)
*H04W 24/00* (2009.01)
*H04B 7/00* (2006.01)
*H04M 11/04* (2006.01)

(52) U.S. Cl.
USPC ..... 370/338; 370/310.2; 370/328; 455/404.2; 455/456.1

(58) Field of Classification Search
USPC ...... 370/315, 310, 310.2, 328, 338, 331–333, 370/352–356; 714/57; 455/33.1, 34.1, 406–408, 455/404.2, 414.2, 421, 456.1–456.6, 433, 455/9, 422.1, 426.1, 432.1–444, 457, 550.1, 455/552.1, 553.1, 554.1, 554.2, 555, 556.1, 455/556.2, 557, 561
See application file for complete search history.

(56) References Cited

U.S. PATENT DOCUMENTS

| | | | | |
|---|---|---|---|---|
| 5,603,081 | A | * | 2/1997 | Raith et al. .................... 455/33.1 |
| 5,778,316 | A | * | 7/1998 | Person et al. .................. 455/434 |
| 5,822,309 | A | * | 10/1998 | Ayanoglu et al. ............. 490/980 |
| 6,122,759 | A | * | 9/2000 | Ayanoglu et al. ............... 714/57 |
| 6,477,156 | B1 | * | 11/2002 | Ala-Laurila et al. .......... 370/331 |
| 7,869,816 | B2 | * | 1/2011 | Merheb et al. ............. 455/456.3 |

(Continued)

FOREIGN PATENT DOCUMENTS

| | | |
|---|---|---|
| JP | 09163440 | 6/1997 |
| JP | 11055286 | 2/1999 |

(Continued)

OTHER PUBLICATIONS

Notice of Reasons for Rejection Office Action dated Jun. 21, 2011, in the corresponding Japanese Application No. 2006-094367.

(Continued)

*Primary Examiner* — San Htun
(74) *Attorney, Agent, or Firm* — Smith, Gambrell & Russell, LLP

(57) ABSTRACT

Access points are grouped into access point groups. An access point group table that stores correlation between the access point groups and the access points and a terminal position table that manages the correlation between the access point groups and a terminal are provided for a position managing server that manages the position of the terminal. An access point notifies the position managing server of the identifier of the access point itself and the identifier of the terminal being connected to the access point. In the position managing server, an access point group to which the access point belongs is found by searching the access point group table. The terminal is registered in the column of "access point group" of the terminal position table.

6 Claims, 13 Drawing Sheets

U.S. PATENT DOCUMENTS

| | | | |
|---|---|---|---|
| 2001/0043577 A1* | 11/2001 | Barany et al. | 370/328 |
| 2002/0177451 A1 | 11/2002 | Ogasawara | |
| 2004/0156372 A1* | 8/2004 | Hussa | 370/401 |
| 2004/0203914 A1* | 10/2004 | Kall et al. | 455/456.1 |
| 2004/0249977 A1* | 12/2004 | Minamisawa | 709/245 |
| 2005/0079857 A1 | 4/2005 | Umezawa et al. | |
| 2005/0197867 A1* | 9/2005 | Edgett et al. | 705/5 |
| 2007/0189249 A1* | 8/2007 | Gurevich et al. | 370/338 |
| 2009/0034536 A1 | 2/2009 | Morand et al. | |

FOREIGN PATENT DOCUMENTS

| | | |
|---|---|---|
| JP | 11341551 | 12/1999 |
| JP | 2000004477 | 1/2000 |
| JP | 2002-507869 | 3/2002 |
| JP | 2002084564 | 3/2002 |
| JP | 2003101551 | 4/2003 |
| JP | 2004140614 | 5/2004 |
| JP | 2004320337 | 11/2004 |
| JP | 2005026936 | 1/2005 |
| JP | 2005117570 | 4/2005 |
| JP | 2005354423 | 12/2005 |
| WO | WO 99/48311 | 9/1999 |
| WO | 2006024791 | 3/2006 |

OTHER PUBLICATIONS

Japanese Office Action dated Jan. 11, 2011 for application No. 2006-094367.

Notice of Rejection dated Nov. 22, 2011, in the corresponding Japanese Application No. 2006-094367 (Partial Translation p. 1, line 1-p. 2, line 25).

* cited by examiner

FIG.3

| GROUP | ACCESS POINT |
|---|---|
| G#1 | AP#1, AP#2, AP#3 |
| G#2 | AP#4, AP#5, AP#6 |

| GROUP | TERMINAL |
|---|---|
| G#1 | TERMINAL T |
| G#2 | |

| GROUP | TERMINAL |
|---|---|
| G#1 | |
| G#2 | TERMINAL T |

| GROUP | CONNECTABLE NUMBER (CONTRACTED NUMBER) | ACTUAL CONNECTION NUMBER |
|---|---|---|
| G#1 | 10 | 5 |
| G#2 | 15 | 0 |

FIG.7

| GROUP | USAGE FEE RATE |
|---|---|
| G#1 | 10 YEN/3 MINUTES |
| G#2 | 8 YEN/3 MINUTES |

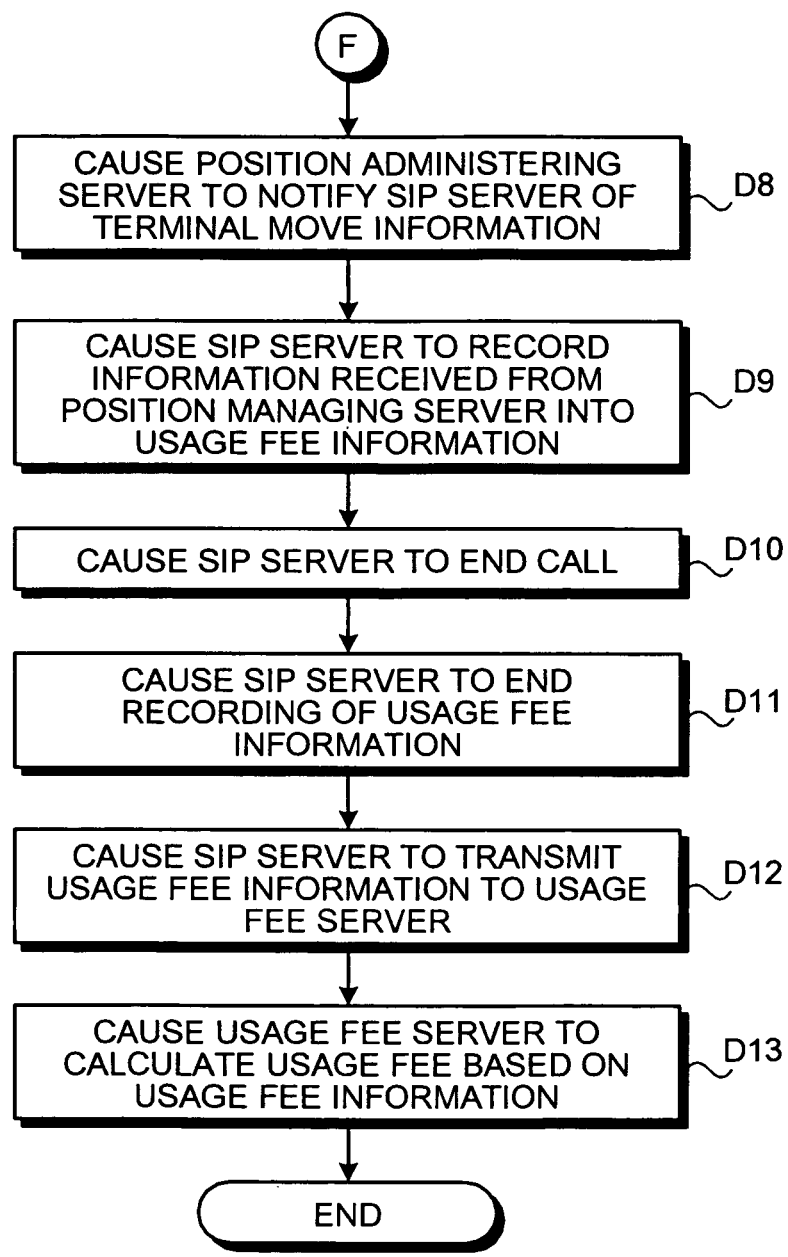

TERMINAL POSITION MANAGING SERVER, ACCESS POINT, AND CALL CONTROL SERVER

CROSS-REFERENCE TO RELATED APPLICATIONS

This application is based upon and claims the benefit of priority from the prior Japanese Patent Application No. 2006-094367, filed on Mar. 30, 2006, the entire contents of which are incorporated herein by reference.

BACKGROUND OF THE INVENTION

1. Field of the Invention

The present invention relates to a position control server, an access point, and a call control server, and more particularly to a position managing server that manages a position of a mobile terminal in an internet protocol (IP) telephone service, an access point, and a call control server.

2. Description of the Related Art

In recent years, IP telephone services have been prevailing. In a common IP telephone system, IP telephones are fixed terminals similarly to an ordinary wired subscriber telephone service. A call control server that controls calls is usually called "SIP server" because the server utilizes a session initiation protocol.

An SIP server utilizes an SIP uniform resource indicator (SIP-URI) as an identifier of a user. However, the position of a user, that is, the installation site of an IP telephone, can not be identified from the SIP-URI. When position information of an IP telephone needs to be utilized at the time of a call process, a table in which the SIP-URI and the installation site are correlated in a static relation is required. However, because this approach only statically manages the position of the IP telephone, this approach can support the case where the IP telephone does not move, however, this approach can not support the case where the telephone moves.

Wireless IP telephone systems using wireless local area networks (LANs) have started to be used as extension lines in companies. If wireless IP telephone services are offered not only inside the companies but also in public wireless LANs and ordinary houses by communication business entities (carriers), it will be possible for a user to use an IP telephone moving freely among a company, a public wireless LAN, and his/her home.

As a consolidated use of public communication networks and private communication networks, the following communication system is known. The communication system includes a mobile switching system (MSC), a first base station subsystem (BSS) having at least one base station (BTS) that communicates through an air interface using a mobile terminal (MS), and a second subsystem (wireless intranet office (WIO), BTS), that has at least one base transceiver station (BTS) that communicates with the mobile terminal (MS) through an air interface, and is accessible by a first group of mobile communication subscribers of the communication system (for example, Japanese Patent Application Laid-Open Publication No. 2002-507869).

However, as described above, dynamic management of the positions of terminals cannot be achieved in the conventional IP telephone system. Therefore, various problems arise when the service area of the wireless IP telephone service is expanded and when a user moves carrying a terminal. For example, in each of areas such as a company, a public wireless LAN, and home, the maximum number of terminals that can be connected at the same time is limited according to the environment such as a band. However, when a terminal can freely move among those areas, the SIP server can not recognize which area the terminal is making a call from with the SIP-URI, and therefore, it is impossible to limit the number of terminals to be connected at the same time from each of the areas.

When a terminal is connected through a LAN in a company or is connected through a public wireless LAN, the usage fee rate may be varied. However, the SIP server can not recognize the area from which a moving terminal is connected with the SIP-URI, and therefore, the usage fee can not be charged according to the usage fee rate corresponding to the location of the terminal. In addition, even if the terminal that has been connected in one area of one usage fee rate moves to another area of a different usage fee rate, the SIP server can not recognize the destination, and therefore, the usage fee can not be charged according to the location change.

To determine the position of a terminal using the IP address thereof can be contemplated as a means to cope with the location change of a terminal. However, generally, private IP addresses that are available only in the LAN within the company are used in companies. A private IP address is dynamically converted into a global IP address by an application level gateway (ALG) installed in a carrier network of the communication carriers. Therefore, the position of a terminal can not be uniquely identified with the IP address in such environment that private IP addresses are used.

SUMMARY OF THE INVENTION

It is an object of the present invention to at least solve the above problems in the conventional technologies.

A position managing server according to one aspect of the present invention manages a position of a mobile terminal wirelessly connected to an access point of a network. The position managing server includes an access point group table in which a plurality of access points are grouped into a plurality of groups each including at least one access point; a terminal position table in which the groups and the mobile terminal are correlated; and a registering unit that registers a current position of the mobile terminal in the terminal position table based on an identifier of the mobile terminal and an identifier of a connected access point that is an access point to which the mobile terminal is connected.

An access point according to another aspect of the present invention relays between a terminal and a network in wireless connection. The access point includes a notifying unit that notifies a server managing a current position of the terminal of a set of an identifier of the access point and an identifier of the terminal being connected to the access point.

A call control server according to still another aspect of the present invention controls connection between a terminal and a network, the terminal wirelessly connected to an access point in the network. The call control server includes an acquiring unit that inquires of a server managing a position of the terminal about the current position of the terminal, and that acquires information on the current position from the server.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 3 illustrates an access point group table;

FIG. 4 illustrates a terminal position table;

FIG. 5 illustrates a terminal position table to which a change of the current position of a terminal T has been made;

FIG. 6 illustrates a simultaneous connection table;

FIG. 7 illustrates a usage fee rate table;

FIG. 16 is a flowchart (Part II) of the usage fee calculating process.

DETAILED DESCRIPTION OF THE PREFERRED EMBODIMENTS

Exemplary embodiments according to the present invention will be described in detail below with reference to the accompanying drawings.

Figure 1:
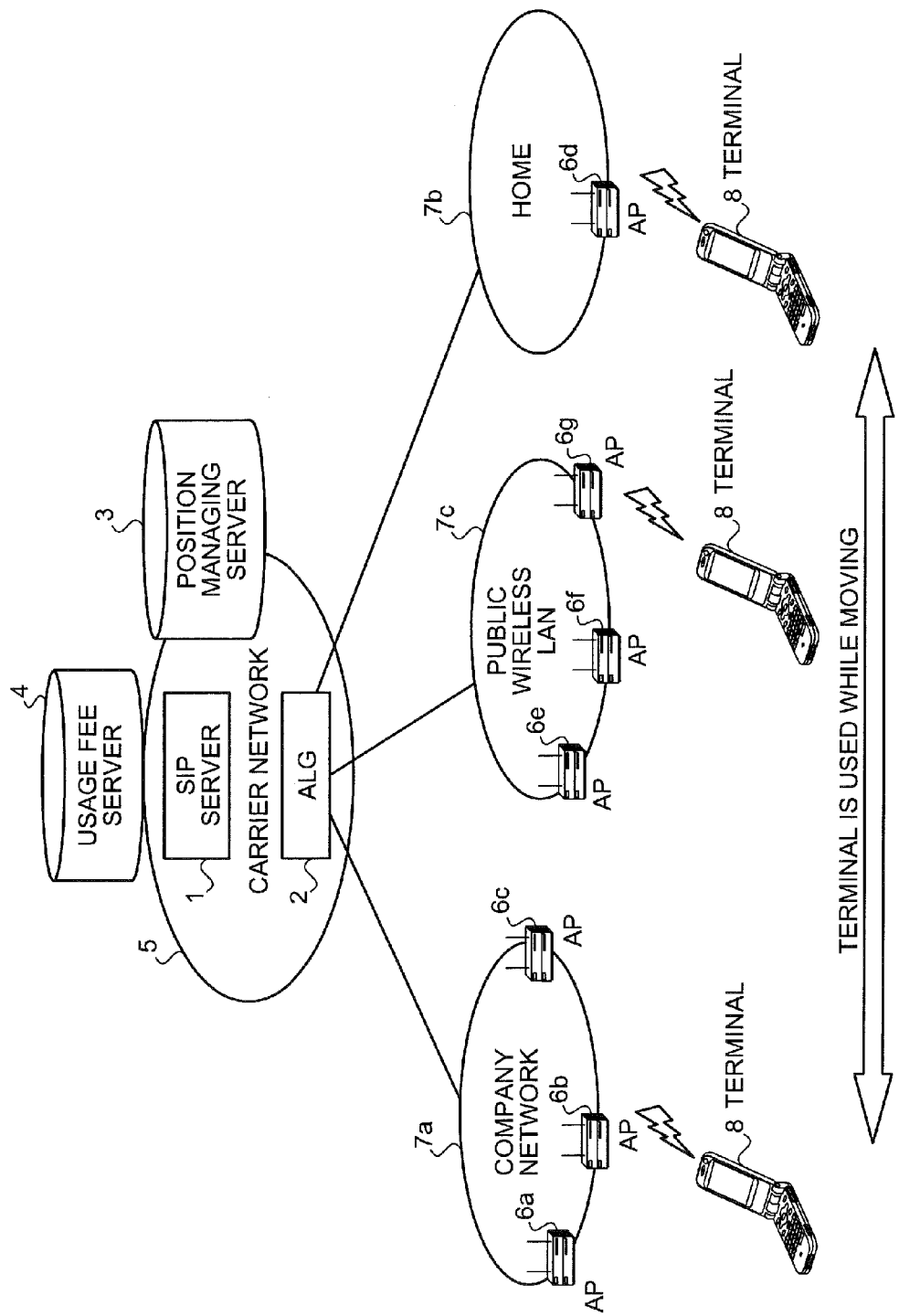
FIG. 1 illustrates a wireless IP telephone system using a position managing server, an access point, and a call control server according to embodiments of the present invention.

FIG. 1 illustrates a wireless IP telephone system using a position managing server, an access point, and a call control server according to embodiments of the present invention. As shown in FIG. 1, the wireless IP telephone system includes a SIP server 1 that is a call control server, an ALG 2, a position managing server 3, a usage fee server 4, and a carrier network 5 to which a DHCP server (not shown), an authenticating server (not shown), etc., are installed.

The wireless IP telephone system includes user networks such as a company network 7a to which one or more access points (APs) 6a, 6b, 6c, and 6d are installed and a home 7b, a public wireless LAN 7c of a communication carriers, to which one or more access points (APs) 6e, 6f, and 6g are installed, and a terminal 8 that can move freely among the company network 7a, the home 7b, and the public wireless LAN 7c. The reason why three terminals 8 are depicted in FIG. 1 is to show that the terminal 8 can move between the company network 7a, the home 7b, and the public wireless LAN 7c.

The terminal 8 has a wireless LAN function according to IEEE802.11a/b/g, etc., and communicates with the networks by connecting to the access points 6a to 6g. The access points 6a to 6g offer communication with the networks to the terminal 8 connected by wireless. Each of the access points 6a to 6g notifies the position managing server 3 of information to identify the terminal 8 being connected.

The access points 6a to 6g are grouped and managed as an access point group. The unit of the group can be arbitrary set as the company network 7a for the whole company or for each base, the home 7b, or the public wireless LAN 7c. Generally, in the company network 7a or the home 7b, a private IP address is given to each of the access points 6a to 6h. In the public wireless LAN 7c, a global IP address is given or a private IP address is given to each of the access points 6a to 6g. In the embodiment, either of a global IP address or a private IP address may be given to each of the access points 6a to 6g.

The ALG 2 converts IP addresses and ports of IP packets transmitted and received among the company network 7a, the home 7b, or the public wireless LAN 7c, etc., and the communication carrier network 5 and exchanges information in SIP messages. When a private IP address is given to each of the terminal 8 and the access points 6a to 6g, the ALG 2 converts a private IP address into a global IP address. Thereby, communication is enabled among each of the terminal 8 and the access points 6a to 6g each being given a private IP address, and each apparatus in the carrier network each being given a global IP address.

The SIP server 1 executes session control based on the SIP protocol. The SIP server 1 inquires of the position managing server 3 about the position of the terminal 8 and receives a response to the inquiry from the position managing server 3. The SIP server 1 notifies the usage fee server 4 of usage fee information of the terminal 8. The usage fee server 4 calculates the fee to be charged to the user of the terminal 8 based on the usage fee information notified of from the SIP server 1.

The position managing server 3 manages which group each of the access points 6a to 6g belongs to and which access point the terminal 8 is currently being connected to. The position managing server 3 receives the information on the terminal 8 being connected that is notified of from each of the access points 6a to 6g. The position managing server 3 responds to the inquiry from the SIP server 1 about the position of the terminal 8.

Figure 2:
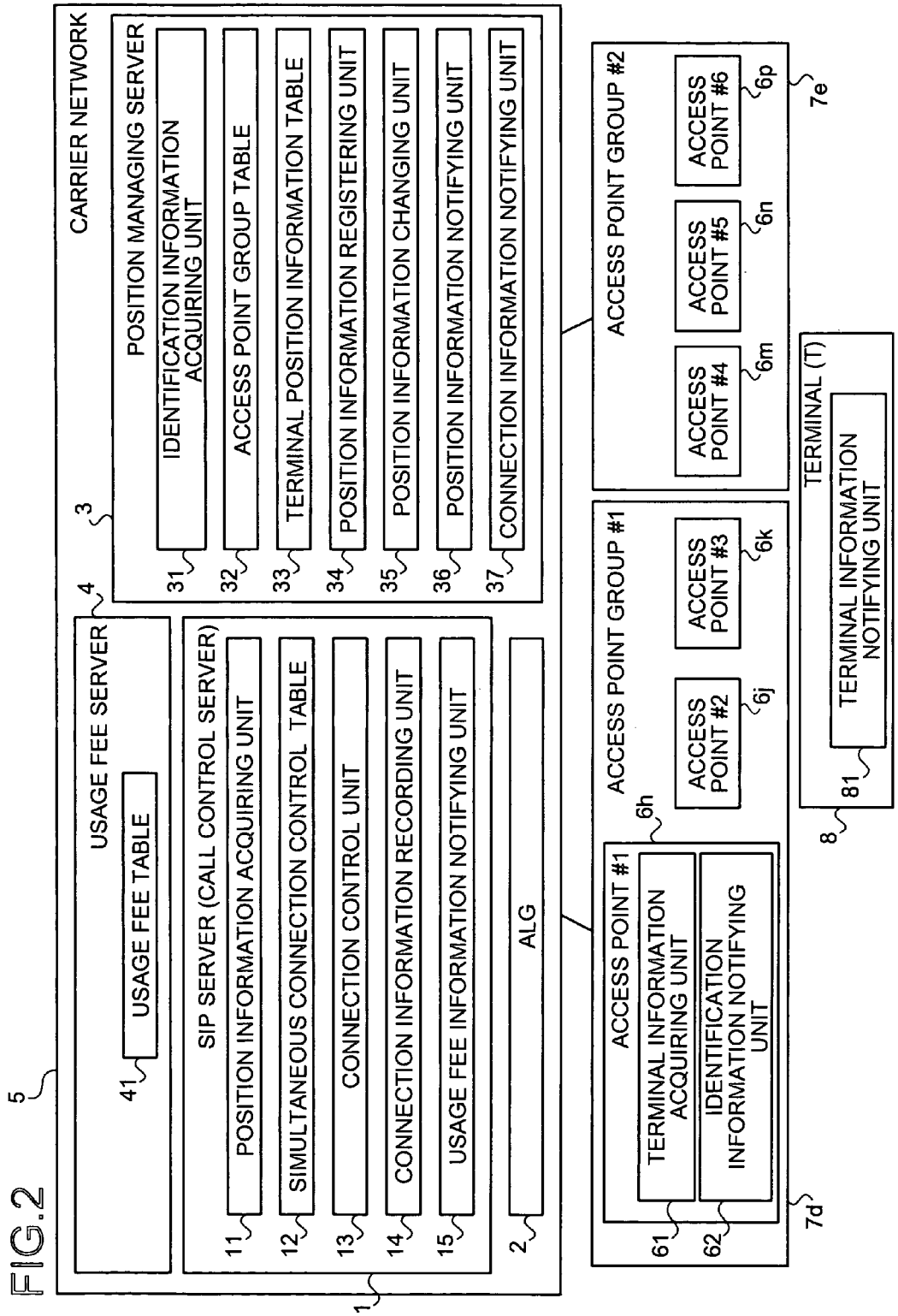
FIG. 2 illustrates configurations of the position managing server, the access points, an SIP server, a usage fee server, and a terminal.

FIG. 2 illustrates configurations of the position managing server, the access points, the SIP server, the usage fee server, and the terminal. As shown in FIG. 2, the terminal 8 includes a terminal information notifying unit 81 that notifies an access point of the connection destination of the identifier of the terminal 8. The SIP-URI of the terminal 8 is used as the identifier of the terminal 8. Otherwise, a global IP address may be used as the identifier of the terminal 8 when each of all the terminals 8 has a global IP address.

Though not especially limited, it is assumed that a first access point group (#1) 7d and a second access point group (#2) 7e are set as the access point groups, and that a first access point (#1) 6b, a second access point (#2) 6j, and a third access point (#3) 6k belong to the first access point group 7d, and a fourth access point (#4) 6m, a fifth access point (#5) 6n, and a sixth access point (#6) 6p belong to the second access point group (#2) 7e.

The first access point 6h includes a terminal information acquiring unit 61 and an identification information notifying unit 62. The terminal information acquiring unit 61 receives the identifier of the terminal 8 from the terminal 8 being connected to. The identification information notifying unit 62 notifies the position managing server 3 of the identifier of the terminal 8 itself and a combination of the identifiers of the terminals 8 being connected to that is acquired from the terminal information acquiring unit 61, using simple network management protocol (SNMP), SIP, etc. The identification information notifying unit 62 may use another communication protocol. The configuration and the operation of each of the second to the sixth access points 6j to 6p are same as those of the first access point 6h, and therefore, the description thereof is omitted.

As the identifier of each of the access points 6h to 6p, an identifier with which each of the access points 6h to 6p can be uniquely identified among communication carriers is used. For example, a basic service set identification (BSSID) or a name specific to an access point is used. Otherwise, a global IP address may be used as the identifier of each of the access points 6h to 6p when a global IP address is given to each of all the access points 6h to 6p.

The position managing server 3 includes an identification information acquiring unit 31, an access point group table 32, a terminal position table 33, a position information registering unit 34, a position information changing unit 35, a position information notifying unit 36, and a connection information notifying unit 37. The identification information acquiring unit 31 receives the identifier of each of the access points 6h to 6p and a combination of the identifiers of the terminals 8 being connected to each of the access points 6h to 6p, from each of the access points 6h to 6p.

The access point group table 32 is a database that manages the correlation between the access point groups 7d and 7e, and access points 6h, 6j, 6k, 6m, 6n, and 6p that belong to the groups. FIG. 3 illustrates the access point group table. A name uniquely identifiable among communication carriers is given to each of access point groups 7d and 7e.

As one example in this case, it is assumed that the names of the first access point group 7d and the second access point group 7e are respectively G#1 and G#2, and that the identifiers of the first, the second, the third, the fourth, the fifth, and the sixth access points 6h, 6j, 6k, 6m, 6n, and 6p are respectively AP#1, AP#2, AP#3, AP#4, AP#5, and AP#6.

The terminal position table 33 is a database that manages the correlation between the names of the access point groups 7d and 7e, and the terminal 8 being connected to the access point group 7d or 7e. The position information registering unit 34 registers the identifier of the terminal 8 in the column for "access point group that the access point of the connection destination belongs to" in the terminal position table 33 based on the identifiers of the access points 6h to 6p acquired from the access points 6h to 6p and the combination of the identifiers of the terminals 8 being connected to access points 6h to 6p.

FIG. 4 illustrates the terminal position table. In FIG. 4, the case is shown in which a terminal T is connected to an access point that belongs to the first access point group 7d and no terminal is connected to any access point that belongs to the second access point group 7e, as an example. In the column for "terminal" of the terminal position table 33, a SIP-URI that is an identifier of a terminal is registered, however, "terminal T" is represented herein for simplicity.

When the position of the terminal 8 registered in the terminal position table 33 is different from the current position of the terminal 8, the position information changing unit 35 changes the position of the terminal 8 registered in the terminal position table 33 to the current position. For example, it is assumed that the terminal T has connected to an access point belonging to the first access point group 7d at the previous time and, therefore, the identifier of the terminal T is registered in the column for the first access point group 7d in the terminal position table 33 (see FIG. 4).

In this state, when the terminal T is connected to an access point belonging to the second access point group 7e, the position information changing unit 35 deletes the identifier of the terminal T from the column for the first access point group 7d in the terminal position table 33 and registers the identifier of the terminal T in the column for the second access point group 7e. FIG. 5 depicts the terminal position table to which the change of the current position of the terminal T has been made.

When the current position of the terminal 8 is inquired about from the SIP server 1, the position information notifying unit 36, in response to the inquiry, refers to the terminal position table 33 and notifies the SIP server 1 of the access point group to which the terminal 8 is connected (in the example of FIG. 4, the first access point group 7d). When the terminal 8 has changed the connection destination thereof, for example, from an access point belonging to the first access point group 7d to an access point belonging to the second access point group 7e during one connection, the connection information notifying unit 37 notifies the SIP server 1 of the second access point group 7e after the change and the time of the day of the change.

The SIP server 1 includes a position information acquiring unit 11, a simultaneous connection control table 12, a connection control unit 13, a connection information recording unit 14, and a usage fee information notifying unit 15. The position information acquiring unit 11 inquires of the position managing server 3 about the current position of the terminal 8, and as a response to the inquiry, acquires from the position managing server 3 the information on the access point group to which the access point connected to the terminal 8 belongs (in the example of FIG. 4, the first access point group 7d).

The simultaneous connection control table 12 stores the number of terminals that can be connected at the same time to each of the access point groups 7d and 7e, and the number of terminals actually connected thereto, for each of the access point groups 7d and 7e. FIG. 6 depicts an example of the simultaneous connection number managing table. FIG. 6 depicts an example that is the case where the simultaneous connectable number (the contracted number) of the first access point group 7d is 10 and the total of the number of terminals that are actually connected to the access points 6h, 6j, and 6k of the first access point group 7d is five and the simultaneous connectable number (the contracted number) of the second access point group 7e is 15 and the number of terminals that are actually connected to the access points 6m, 6n, and 6p of the second access point group 7e is 0.

When a call making request is issued from the terminal 8, the connection control unit 13 acquires from the position managing server 3 information on the access point group to which the access point of the connection destination of the terminal 8 belongs. The connection control unit 13 refers to the simultaneous connection control table 12 and, when the number of actual connections of the access point group is less than the simultaneous connectable number, accepts the call making request and continues the call process. When the number of actual connections is equal to the simultaneous connectable number, the connection control unit 13 stops the call process.

The connection information recording unit 14 records as connection information the starting time of the call process in response to the call-making request of the terminal 8 and the name of the access point group that the access point at that time of the connection destination belongs to; when an access point belonging to a different access point group is connected during the connection, the name of the access point group of the new connection destination acquired from the position information notifying unit 36 of the position managing server 3 and the time of the change; and the ending time of the series of call process steps. The usage fee information notifying unit 15 notifies the usage fee server 4 of the connection information recorded by the connection information recording unit 14 as usage fee information.

The usage fee server 4 includes a usage fee table 41. The usage fee table 41 is a database that manages the correlation between the access point groups 7d and 7e and usage fee rates. FIG. 7 depicts an example of the usage fee table. FIG. 7 depicts an example that is the case where the usage fee rate of the first access point group 7d is 10 yen per three minutes and the usage fee rate of the second access point group 7e is eight yen per three minutes. The configurations and the operations thereof that realize the functions other than the position administration of the terminal 8 such as a transmitting process, a receiving process, a confidentiality process of data are omitted as to the SIP server 1, the ALG 2, the access points 6h, 6j, 6k, 6m, 6n, and 6p, and the terminal 8.

Description will be given for the operation executed when the terminal 8 (hereinafter, "terminal T8") is connected to the first access point 6h of the first access point group 7d. In this case, it is assumed that the information of the terminal T8 is not registered in the position managing server 3 because the terminal T8 is connected to any one access point for the first time, or a specific time period has passed since the terminal T8 was connected to the access point at the previous time and, therefore, the registered information of the terminal T8 has been deleted from the position managing server 3. Therefore, a process to register the initial position of the terminal T8 is executed caused by the connection of the terminal T8.

Figure 8:
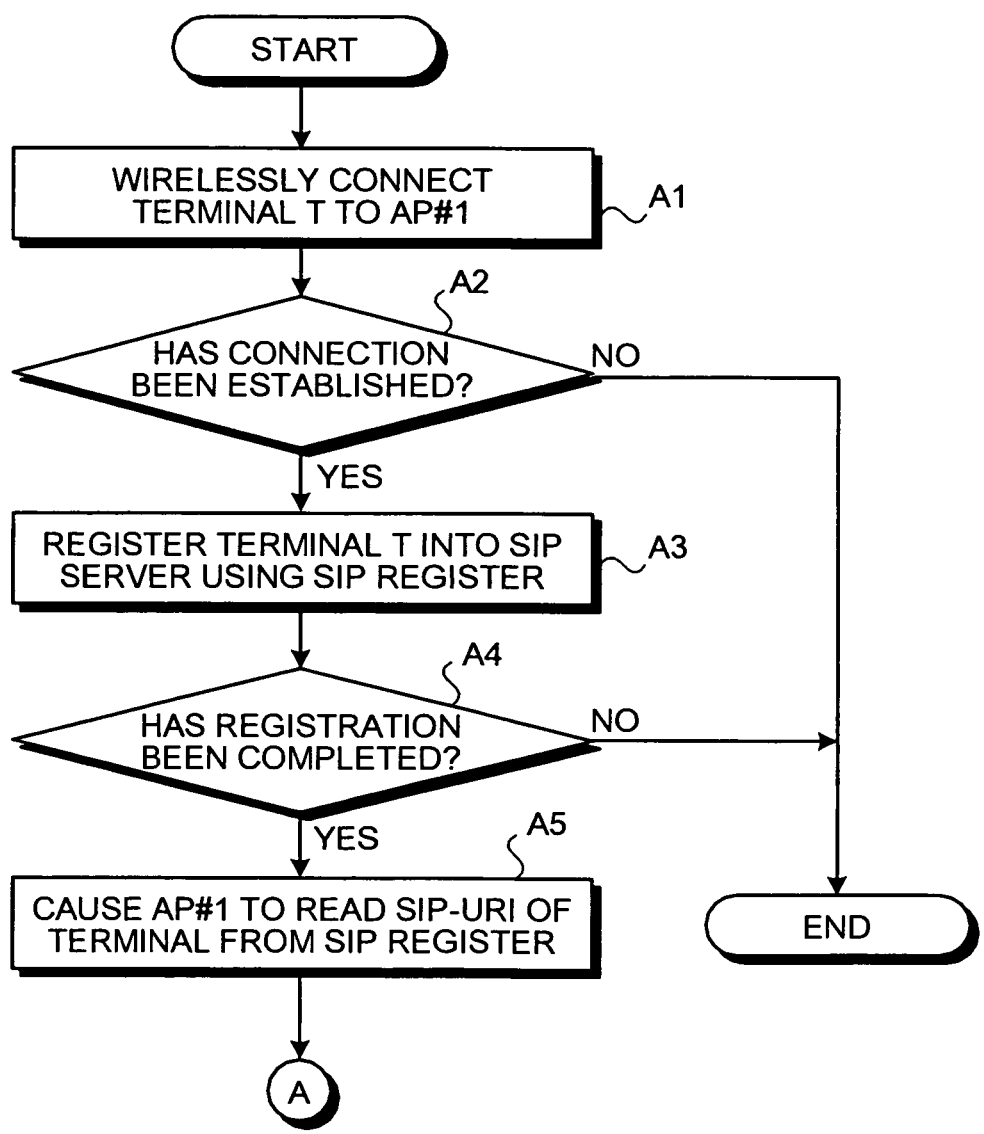
FIG. 8 is a flowchart (Part I) of an initial position registering process.
Figure 9:
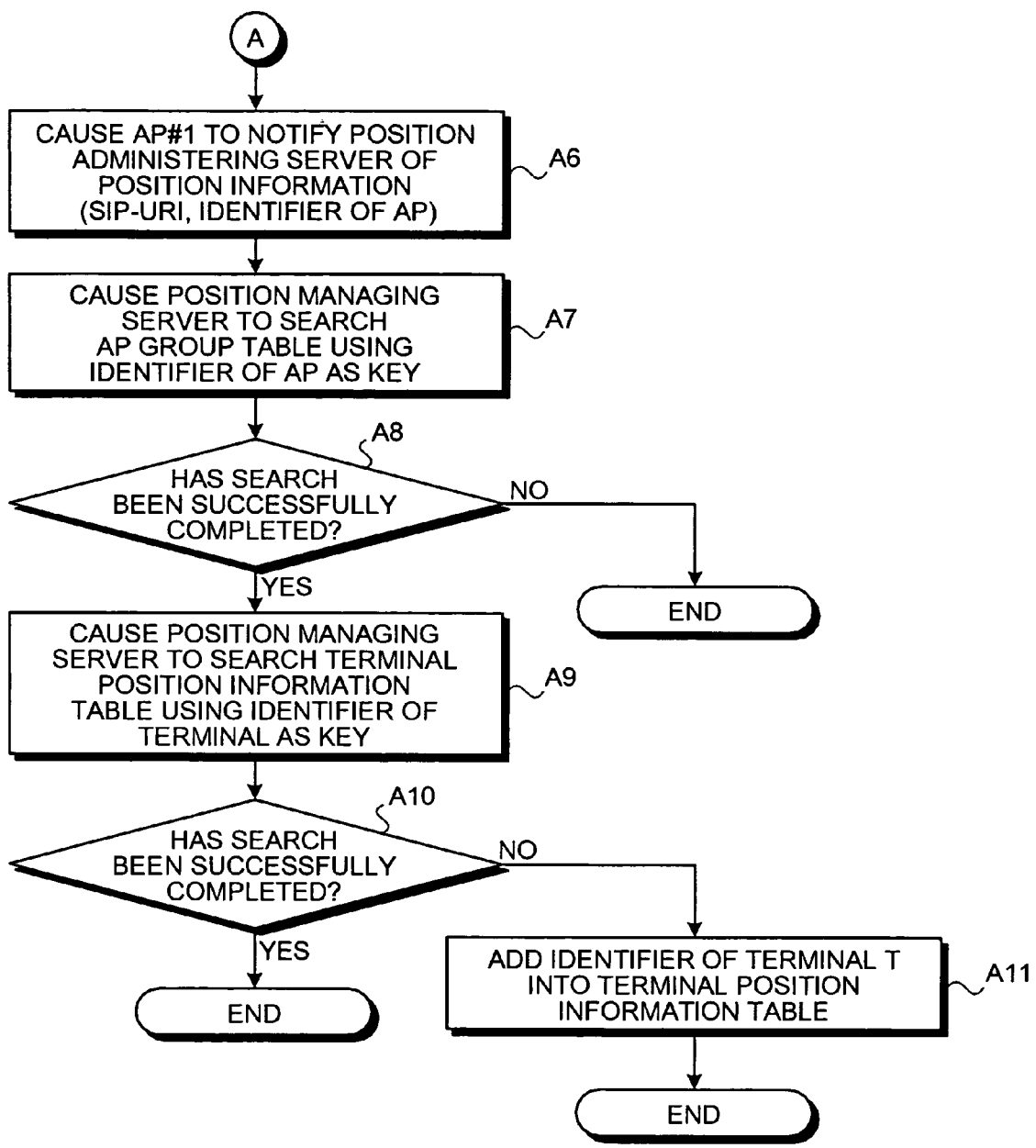
FIG. 9 is a flowchart (Part II) of the initial position registering process.

FIGS. 8 and 9 are flowcharts of an initial position registering process. Processes shown in FIG. 9 are continued from that shown in FIG. 8. As shown in FIG. 8, the terminal T8 starts a wireless connection to the first access point 6h (step A1). When the connection is established (step A2: YES), the terminal T8 starts registration to the SIP server 1 using a SIP REGISTER (step A3). When the registration has been completed (step A4: YES), the first access point 6h reads the SIP-URI of the terminal T8 from the SIP REGISTER (step A5).

When the terminal T8 can not be connected to the first access point 6h (step A2: NO) or when the terminal T8 is not registered in the SIP server 1 (step A4: NO), an error process is executed and the initial position registering process is ended. Following step A5, as shown in FIG. 9, the first access point 6h notifies the position managing server 3 of the SIP-URI of the terminal T8 and the identifier of the first access point 6h itself as position information (step A6).

The position managing server 3 searches the access point group table 32 using the identifier of the first access point 6h as a key of the information received from the first access point 6h and retrieves the access point group that the first access point 6h belongs to (step A7). When the retrieval can not be completed (step A8: NO), an error process is executed and the initial position registering process is ended. When the retrieval is completed (step A8: YES), the first access point 6h turns out to belong to the first access point group 7d and, therefore, the position managing server 3 searches the terminal position table 33 using the identifier (the SIP-URI) of the terminal T8 as a key and retrieves the presence or absence of an entry of the terminal T8 (step A9).

As a result, when the entry of the terminal T8 can be retrieved (step A10: YES), the initial position registering process is ended. When no entry of the terminal T8 is found (step A10: NO), the identifier of the terminal T8 is added into the column for "terminal" corresponding to the first access point group 7d of the terminal position table 33 (step A11), and the series of initial position registering process steps are ended.

Description will be given for the case where the terminal T8 moves after the terminal TB has been connected to an access point belonging to the first access point group 7d, is located in the area of the second access point group 7e, and is connected to the fourth access point 6m. In this case, it is assumed that the identifier of the terminal T8 is registered in the column for "terminal" corresponding to the first access point group 7d of the terminal position table 33. Therefore, a process to register the position of the terminal T8 during the move thereof is executed caused by the connection of the terminal T8 to the fourth access point 6m after the move thereof.

Figure 10:
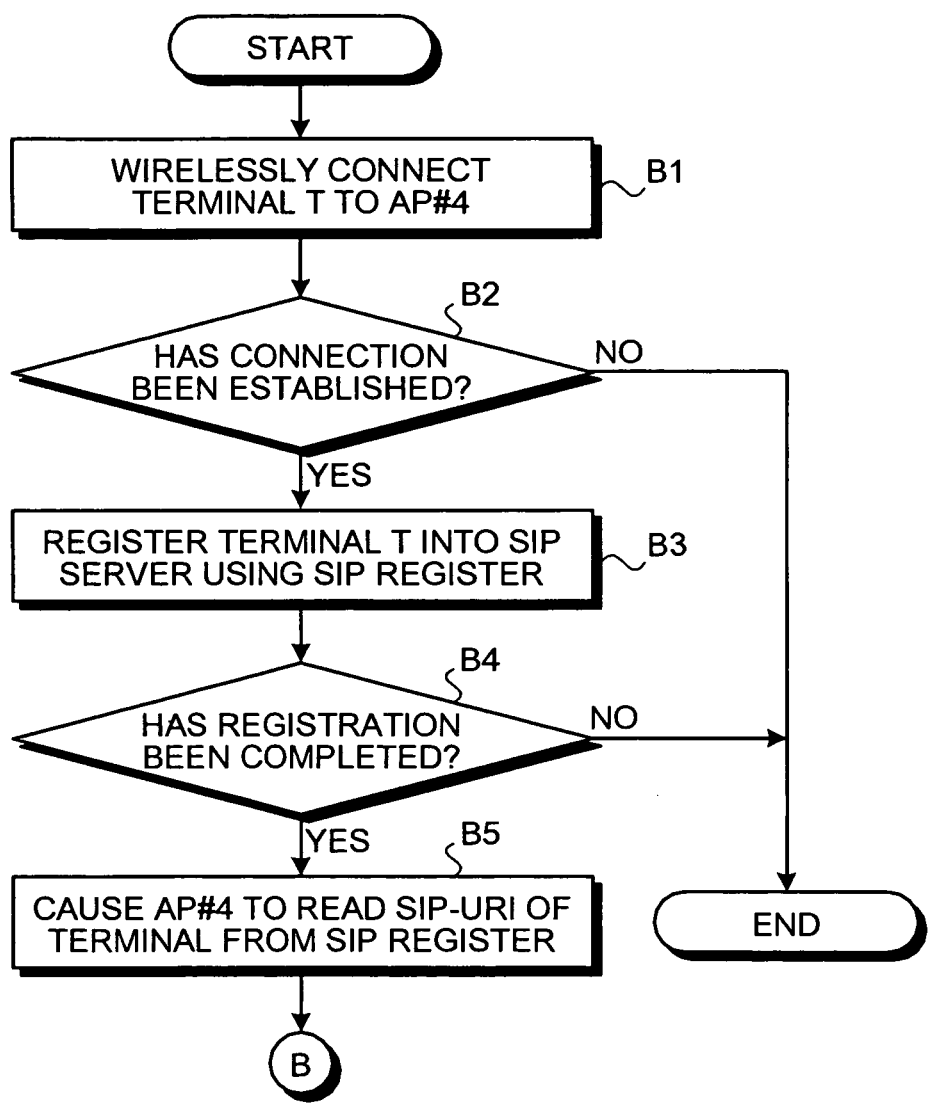
FIG. 10 is (Part I) a flowchart of a moving position registering process.
Figure 11:
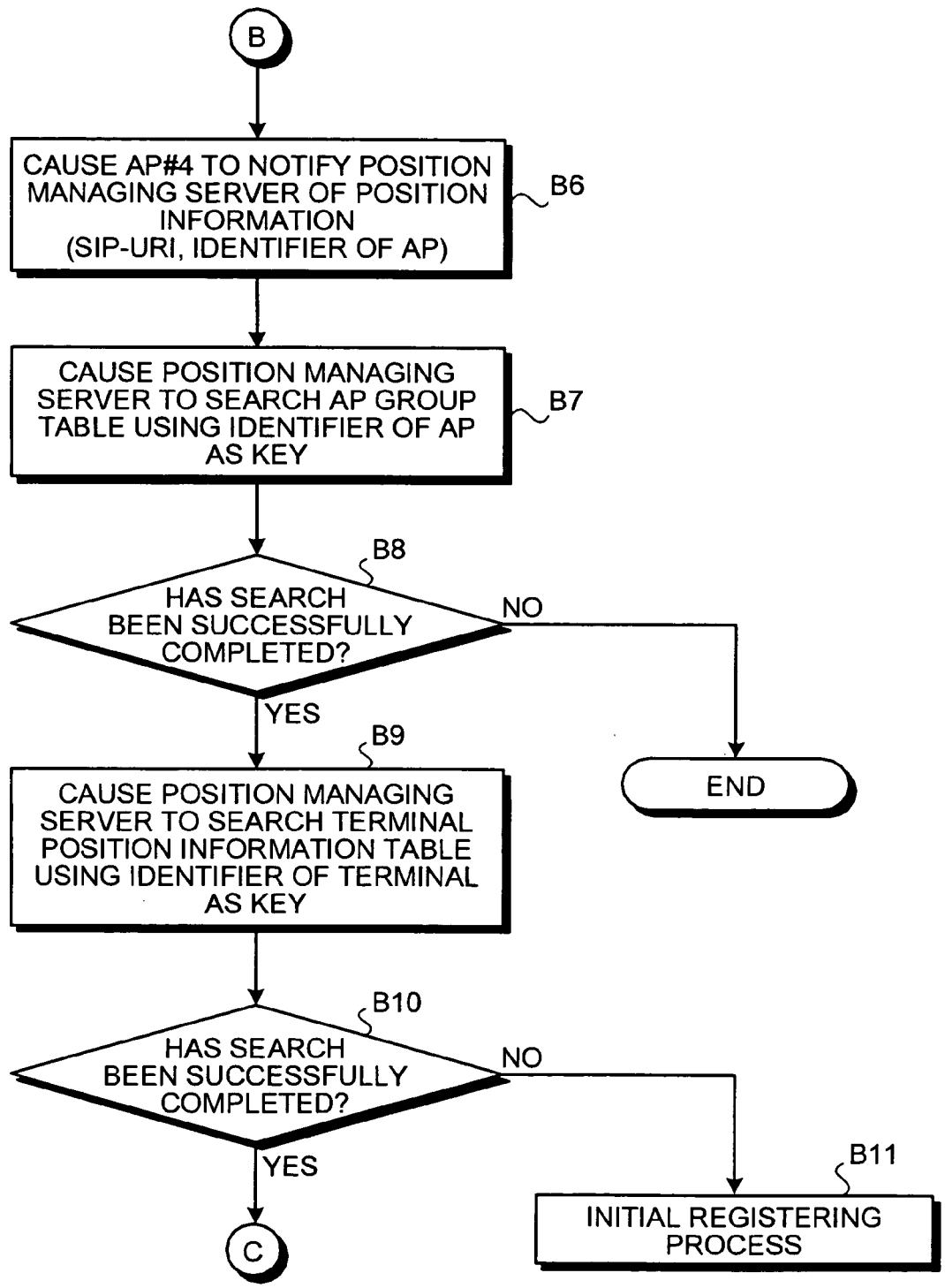
FIG. 11 is (Part II) a flowchart of the moving position registering process.
Figure 12:
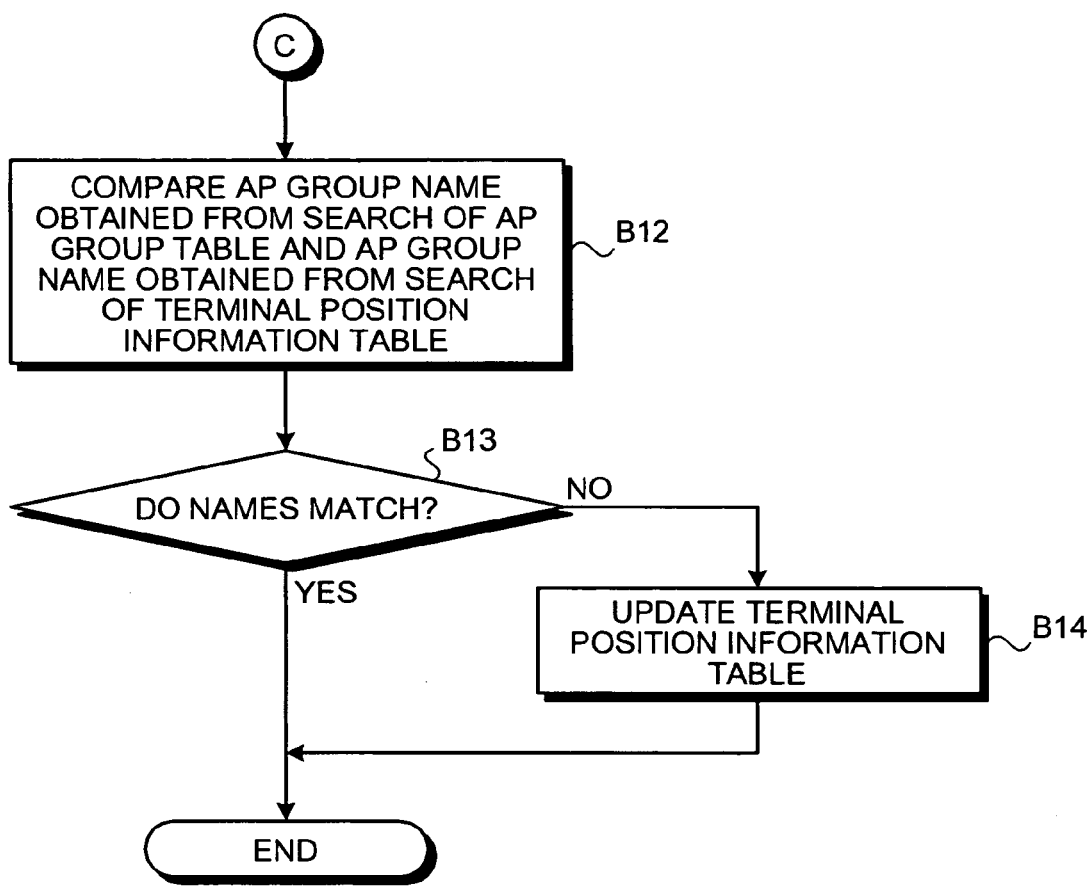
FIG. 12 is (Part III) a flowchart of the moving position registering process.

FIGS. 10 to 12 are flowcharts of a moving position registering process. Processes shown in FIGS. 11 and 12 are respectively continued portions of FIGS. 10 and 11. As shown in FIG. 10, the terminal T8 starts a wireless connection to the fourth access point 6m (step B1). When the connection has been established (step B2: YES), the terminal T8 starts registration thereof to the SIP server 1 using the SIP REGISTER (step B3). When the registration has been completed (step B4: YES), the fourth access point 6m reads the SIP-URI of the terminal TB from the SIP REGISTER (step B5).

When the terminal T8 can not be connected to the fourth access point 6m (step B2: NO) or when the terminal T8 is not registered in the SIP server 1 (step B4: NO), an error process is executed and the moving position registering process is ended. Following step B5, as shown in FIG. 11, the fourth access point 6m notifies the position managing server 3 of the SIP-URI of the terminal T8 and the identifier of the fourth access point 6m itself as position information of the terminal T8 (step B6).

The position managing server 3 searches the access point group table 32 using the identifier of the fourth access point 6m as a key of the information received from the fourth access point 6m and retrieves the access point group to which the fourth access point 6m belongs (step B7). When the retrieval can not be completed (step B8: NO), an error process is executed and the moving position registering process is ended. When the retrieval is successfully completed (step B8: YES), the fourth access point 6m turns out to belong to the second access point group 7e and, therefore, the position managing server 3 searches the terminal position table 33 using the identifier (the SIP-URI) of the terminal T8 as a key and retrieves the presence or absence of an entry of the terminal T8 (step B9).

When no entry of the terminal T8 is found (step B10: NO), an initial registering process is executed that adds the identifier of the terminal T8 into the column for "terminal" corresponding to the second access point group 7e of the terminal position table 33 (step B11). When the entry of the terminal T8 can be retrieved (step B10: YES), the terminal T8 is turned out to be registered in the column for "terminal" corresponding to the first access point group 7d.

As shown in FIG. 12, the name of the access point group (G#1) turned out by searching the access point group table 32 at step B7 is compared with the name of the access point group (G#2) turned out by searching the terminal position table 33 at step B9 (step B12). When both group names match (step B13: YES), the moving position registering process is ended.

When the group names do not match (step B13: NO), the identifier of the terminal T8 registered in the column for "terminal" corresponding to the first access point group 7d of the terminal position table 33 is deleted. The identifier of the terminal T8 is added to the column for "terminal" corresponding to the second access point group 7e of the terminal position table 33. Such updating of the terminal position table 33 is executed (step B14) and the series of moving position registering process steps are ended.

By executing the moving position registering process, the position managing server 3 can manage at real time the information on the access point group to which the terminal T8 belongs. The moving position registering process can cope with both of the case where the terminal T8 moves during one connection and is located in the areas of a plurality of access point groups and the case where the terminal T8 makes a call in the area of an access point group that is different from that of the previous time.

Description will be given for a process that limits the number of terminals connected at the same time for each access point group. It is assumed that the correlation between the access point groups and the terminal T8 is known due to the above initial position registering process and the moving position registering process. When the terminal T8 issues a call making request, the process that limits the number of simultaneously connected terminals is executed.

Figure 13:
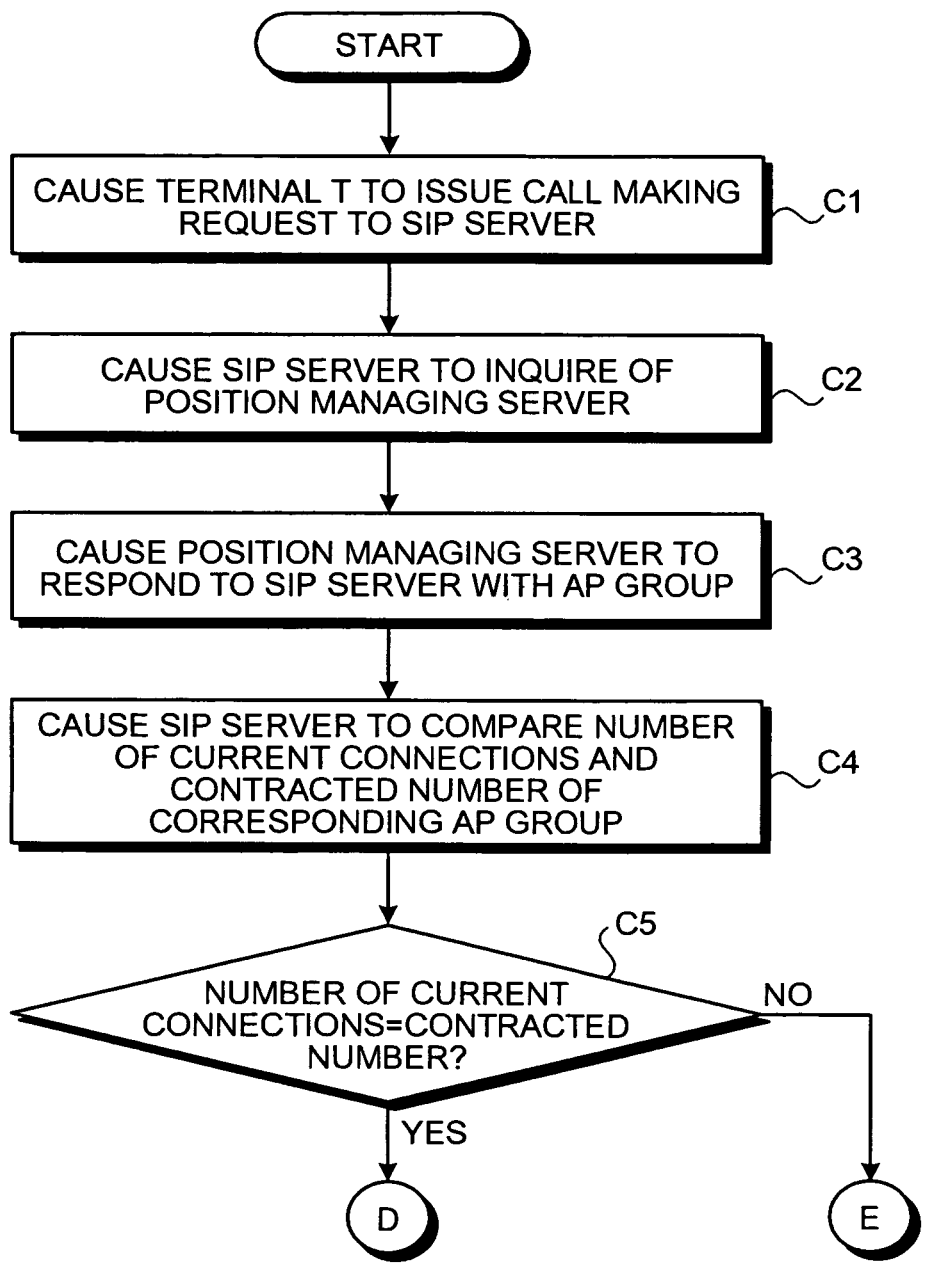
FIG. 13 is a flowchart (Part I) of a simultaneous connection control process.
Figure 14:
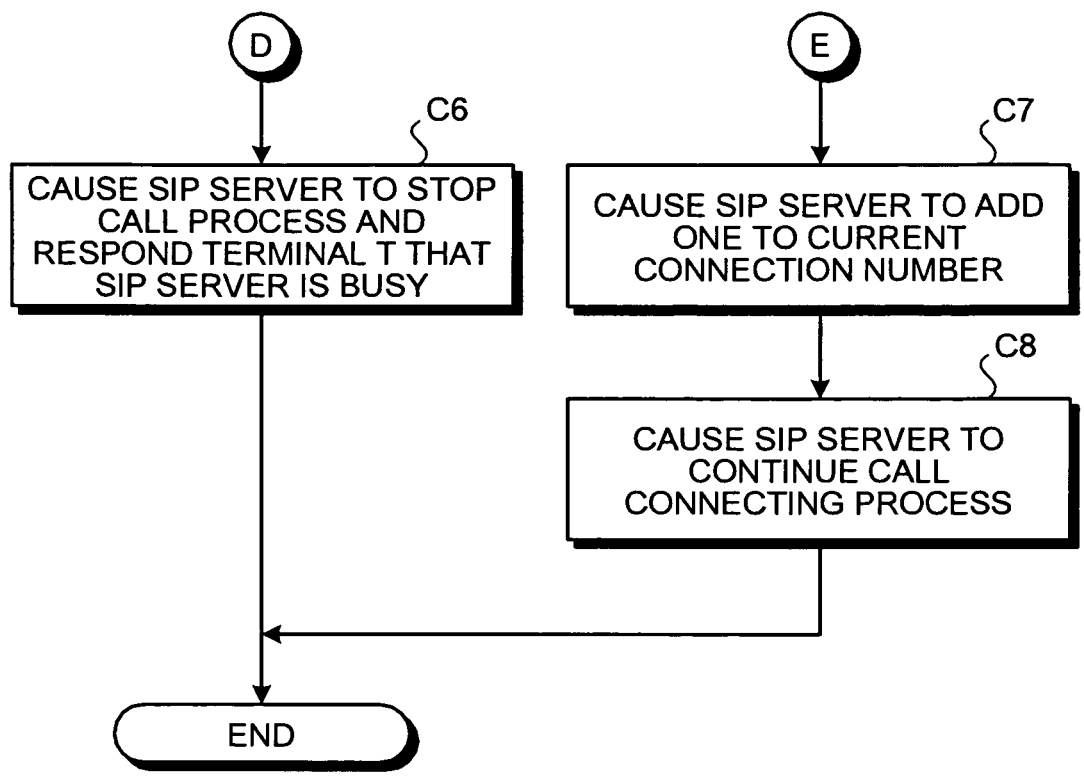
FIG. 14 is a flowchart (Part II) of the simultaneous connection control process.

FIGS. 13 and 14 depict a flowchart of the simultaneous connection control process and FIG. 14 is a continued portion of FIG. 13. As shown in FIG. 13, when the terminal T8 issues a call making request to the SIP server 1 using SIP INVITE (step C1), the SIP server 1 inquires of the position managing server 3 which access point group the terminal T8 is located in (step C2). In response to the inquiry from the SIP server 1, the position managing server 3 responds with the name of the access point group in which the terminal T8 is located (step C3).

The SIP server 1 refers to the simultaneous connection control table 12 and compares the number of current actual connections with the number of simultaneously connectable terminals (the contracted number) for the access point group responded with from the position managing server 3 (step C4). As a result, when the number of current actual connections is equal to the number of simultaneously connectable terminals (the contracted number) (step C5: YES), the SIP server 1 discontinues the call process and responds to the terminal T8 that the SIP server 1 is busy (step C6) and the series of simultaneous connection control process steps are ended, as shown in FIG. 14.

When the number of current actual connections is not equal to the number of simultaneously connectable terminals (the contracted number) (step C5: NO), the number of current actual connections is less than the number of simultaneously connectable terminals (the contracted number). Therefore, as shown in FIG. 14, the SIP server 1 adds one to the value in the column for "number of current actual connections" corresponding to the access point group concerned in the simultaneous connection control table 12 (step C7). The SIP server 1 continues a call connecting process (step C8) and the series of simultaneous connection control process steps are ended. By executing the simultaneous connection control process, for example, a service can be executed that limits the number of terminals actually connected simultaneously to a number less than the contracted number for each base by setting the number of simultaneously connected terminals for each base in a company.

Description will be given for a process to charge the fee at a usage fee rate that differs depending on each access point group when a usage fee rate is set for each access point group and the terminal T8 moves among the areas of access point groups each having a usage fee rate different from each other during one connection thereof. It is assumed that the correlation between the access point groups and the terminal T8 is known due to the above initial position registering process and the moving position registering process. When the terminal T8 issues a call making request, a usage fee calculating process is executed.

Figure 15:
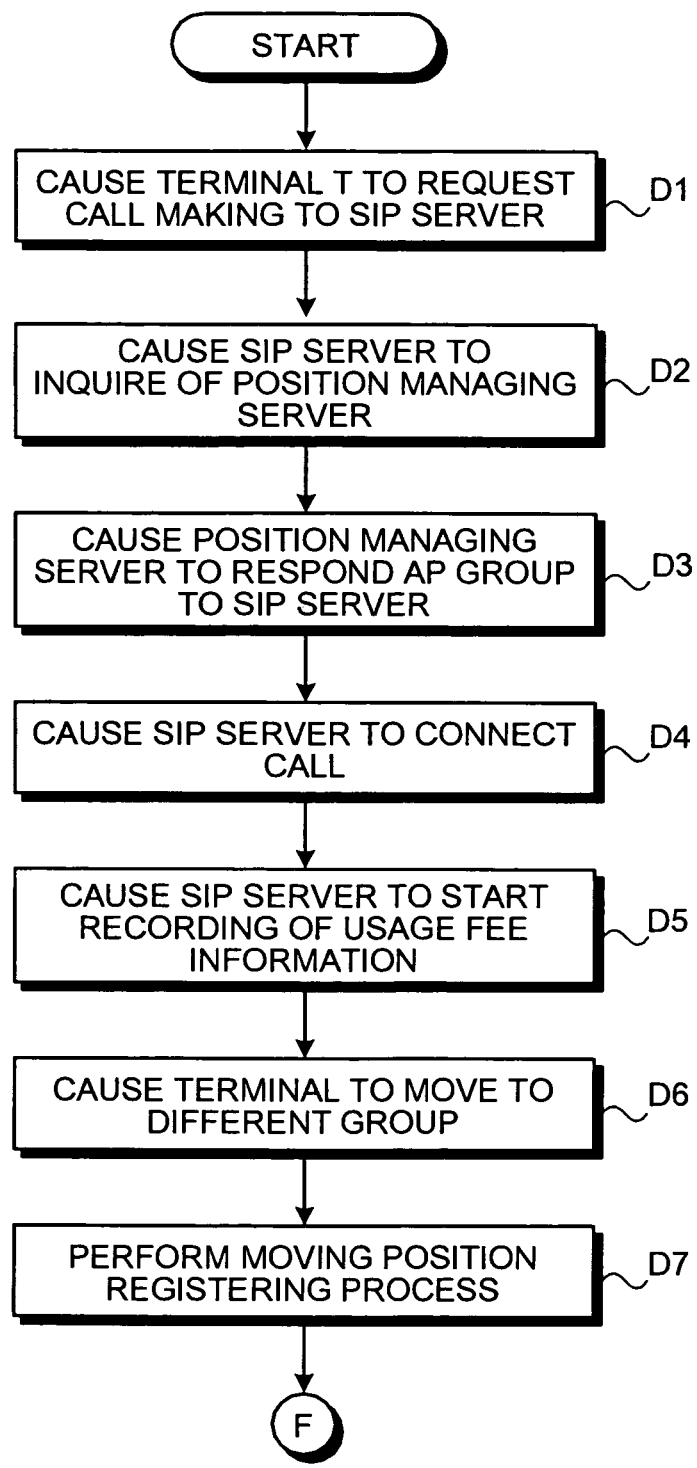
FIG. 15 is a flowchart (Part I) of a usage fee calculating process.

FIGS. 15 and 16 depict a flowchart of the usage fee calculating process and FIG. 16 is a continued portion of FIG. 15. As shown in FIG. 15, when the terminal T8 issues a call making request to the SIP server 1 using SIP INVITE (step D1), the SIP server 1 inquires of the position managing server 3 which access point group the terminal T8 is located in (step D2).

In response to the inquiry from the SIP server 1, the position managing server 3 responds with the name of the access point group in which the terminal 8 is located (step D3). In this case, it is assumed that the terminal T8 is connected to the first access point 6h and "G#1" that is the name of the first access point group 7d is responded with from the position managing server 3 to the SIP server 1. The SIP server 1 connects the call (step D4), starts recording of usage fee information, and records the starting time of the call process and the name of the connection destination access point group (step D5).

When the terminal T8 moves during the connection and, as a result, the connection destination is changed from the first access point 6h to the fourth access point 6m (step D6), the above moving position registering process is executed and the terminal position table 33 is updated (step D7). As shown in FIG. 16, the position managing server 3 notifies the SIP server 1 of the name of the access point group including an access point that is the new connection destination of the terminal T8 and the time at which the connection destination is changed as terminal move information (step D8). In this case, G#2 is responded with that is the name of the second access point group 7e from the position managing server 3 to the SIP server 1.

The SIP server 1 records the information received from the position managing server 3 as usage fee information (step D9). When the call is ended, the SIP server 1 ends the call process (step D10), records the ending time, and ends the recording of the usage fee information (step D11). The SIP server 1 transmits the usage fee information recorded therein to the usage fee server 4 (step D12).

The transmitted usage fee information includes the call starting time, the call ending time, and the name of the access point group including the access point of the connection destination. When the connection destination of the terminal T8 is changed to another access point belonging to a different access point group during one connection, the name of the access point group to which the access point of the new connection destination and the time of the change are also transmitted as usage fee information. Not limiting to the above pieces of information, the usage fee information is updated as necessary, according to the difference in the usage fee calculating scheme.

The usage fee server 4 refers to the usage fee table 41 and calculates the fee corresponding to the rate of each access point group based on the usage fee information received from the SIP server 1 (step D13) and ends the series of usage fee calculating process steps. By executing the usage fee calculating process, fee charging corresponding to the transmission area of a user is enabled. For example, it is possible to vary the usage fee rate between the case where the user transmits from the public wireless LAN 7c and the case where the user transmits from the home 7b.

As described above, according the embodiment, the identifier of the terminal 8 and the identifier of the first access point 6h that the terminal 8 is being connected to are notified of from the first access point 6h to the position managing server 3 and, based on the notified combination of the identifiers, the position managing server 3 manages the correlation between the access points and the access point groups and the correlation between the access point groups and the terminal 8 using the access point group table 32 and the terminal position table 33. Therefore, the location of the terminal 8 that is moving can be dynamically managed.

Thereby, a subscriber can receive seamlessly the wireless IP telephone service from the communication carriers without noticing his/her location in a company, a public wireless LAN, or a home.

By managing the actual connection number and the contracted number of terminals using the simultaneous connection control table 12, the number of simultaneous connections of the terminals can be limited for each access point group. By setting a usage fee rate for each access point group using the usage fee table 41, the fee can be charged at usage fee rates that are different respectively for the access point groups.

The maximum number of simultaneously connectable terminals can be dynamically varied corresponding to the number of users in an access point group. A user can be restrained from transmitting from an access point group, that is, a network. The usage fee rate can be varied according to the number of users in an access point group.

Because a communication carrier can grasp at real time the location of a subscriber, the communication carrier can offer a new service utilizing the position information of the subscriber such as a service of sending information of the area, corresponding to the area of the access point group in which the terminal is located. Corresponding to the area of the access point group that the terminal is located in, the communication carriers can also limit the networks, services, etc., that the terminal can access and offer a service that changes the transfer destination of a call, etc.

According to the embodiments described above, dynamic management of the position of a moving terminal can be realized. Moreover, the number of simultaneously-connected terminals can be limited for each area. Furthermore, the usage fee can be calculated at usage fee rates depending on the area.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A position managing server that manages a position of a mobile terminal wirelessly connected to an access point of a network, comprising:
    a processor, memory coupled to and accessible by the processor, and program instructions stored in the memory and executable by the processor for implementing:
    an access point group table in which a plurality of access points are grouped into a plurality of groups each including at least one access point, one group of access points corresponding to a current position of the mobile terminal;
    a terminal position table in which the groups and the mobile terminal are correlated;
    a registering unit that registers the current position of the mobile terminal in the terminal position table based on an identifier of the mobile terminal and an identifier of a connected access point that is an access point to which the mobile terminal is connected;
    a changing unit that changes, when the connected access point does not belong to any of the groups in the terminal position table, the position registered in the terminal position table to the current position based on the access point of the current connection destination; and
    a notifying unit that, when the terminal changes connection destinations to another of the access points belonging to a different group while maintaining connection, notifies a call control server of a group to which the other of the access points belongs, and time of change of the connection destinations,
    wherein the position managing server is part of a wireless Internet Protocol telephone system.

2. The position managing server according to claim 1, wherein the notifying unit notifies of the group corresponding to the current position of the terminal in response to an inquiry about the current position of the terminal from the call control server.

3. The position managing server according to claim 1, wherein a basic service set identification is used as an identifier of the access point.

4. The position managing server according to claim 1, wherein a global internet protocol address is used as the identifier of the access point.

5. A call control server that controls connection between a terminal and a network, the terminal wirelessly connected to an access point in the network, comprising:
    a processor, memory coupled to and accessible by the processor, and program instructions stored in the memory and executable by the processor for implementing:
    an acquiring unit that inquires of a server managing a position of the terminal about a current position of the terminal, and that acquires information on the current position from the server, the information reflecting the latest version of a terminal position table of the terminal;
    a simultaneous connection table in which a plurality of access points are grouped into a plurality of groups each including at least one access point, and number of connectable terminals and number of terminal actually being connected are correlated for each of the groups; and
    a control unit that controls whether to connect the terminal based on information on the current position and information included in the simultaneous connection table,
    wherein a group of access points corresponds to the current position of the terminal, the position managing server is part of a wireless Internet Protocol telephone system, and when the terminal changes connection destinations from a first access point belonging to a first group to a second access point belonging to a second group while maintaining connection, the call control server is notified of the second group and time of change of the connection destinations.

6. The call control server according to claim 5, further comprising a recording unit that, when the terminal is connected to access points belonging to different groups, records, for each of the different groups, connection time for which the terminal is connected to each of the access points in the different groups.

* * * * *